(12) United States Patent
Ogino et al.

(10) Patent No.: US 7,711,376 B2
(45) Date of Patent: May 4, 2010

(54) METHOD OF PROVIDING LOCATION SERVICE USING CDMA-BASED CELLULAR PHONE SYSTEM, A METHOD OF MEASURING LOCATION AND LOCATION SYSTEM

(75) Inventors: Atsushi Ogino, Kodaira (JP); Mikio Kuwahara, Kokubunji (JP); Tomoaki Ishifuji, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 2010 days.

(21) Appl. No.: 09/781,187

(22) Filed: Feb. 13, 2001

(65) Prior Publication Data

US 2002/0004398 A1    Jan. 10, 2002

(30) Foreign Application Priority Data

Jul. 10, 2000    (JP) .............................. 2000-213375

(51) Int. Cl.
    *H04W 24/00* (2009.01)
(52) U.S. Cl. .............. 455/456.2; 455/456.1; 455/404.2; 455/410; 455/422.1; 455/403
(58) Field of Classification Search .............. 455/456.1, 455/432, 435.2, 437, 456.2, 456.3, 404.2, 455/456.5, 456.6, 410, 406, 408, 411
    See application file for complete search history.

(56) References Cited

U.S. PATENT DOCUMENTS

| | | | | |
|---|---|---|---|---|
| 5,293,645 | A * | 3/1994 | Sood ........................ | 455/456.2 |
| 5,423,067 | A * | 6/1995 | Manabe ..................... | 455/524 |
| 5,722,080 | A * | 2/1998 | Kondo ....................... | 455/502 |
| 5,736,934 | A * | 4/1998 | Nozawa et al. ............. | 340/7.43 |
| 5,952,969 | A * | 9/1999 | Hagerman et al. .......... | 342/457 |
| 5,983,113 | A * | 11/1999 | Asanuma .................... | 455/502 |
| 6,023,618 | A * | 2/2000 | Janhonen et al. ............ | 455/406 |
| 6,031,490 | A * | 2/2000 | Forssen et al. .............. | 342/457 |
| 6,208,871 | B1 * | 3/2001 | Hall et al. ................... | 455/517 |
| 6,230,018 | B1 * | 5/2001 | Watters et al. ........... | 455/456.3 |
| 6,275,705 | B1 * | 8/2001 | Drane et al. ............. | 455/456.2 |

(Continued)

FOREIGN PATENT DOCUMENTS

JP    7-181242    7/1995

(Continued)

OTHER PUBLICATIONS

Japanese Office Action issued in corresponding Japanese Patent Application No. 2000-213375 Dated Jun. 13, 2006.

*Primary Examiner*—Huy Phan
(74) *Attorney, Agent, or Firm*—McDermott Will & Emery LLP

(57) ABSTRACT

At least three base stations transmit a specific signal pattern at given intervals. This allows a mobile station that received this signal pattern to locate itself by using the positional information about the base stations, sending timing (or information on phase shift from the reference time) of each signal pattern from the base stations, and signal pattern receiving time information. At least one of the above base stations changes the sending timing of the signal pattern. On this occasion, the mobile terminal or station is notified of the altered reference time offset (or information on phase shift from the reference time) of the sending timing or updated sending timing of the signal pattern.

23 Claims, 16 Drawing Sheets

U.S. PATENT DOCUMENTS

| | | | |
|---|---|---|---|
| 6,405,047 B1 * | 6/2002 | Moon | 455/456.1 |
| 6,429,815 B1 * | 8/2002 | Soliman | 342/357.15 |
| 6,549,775 B2 * | 4/2003 | Ushiki et al. | 455/432.1 |
| 6,671,377 B1 * | 12/2003 | Havinis et al. | 380/258 |
| 6,674,860 B1 * | 1/2004 | Pirila | 380/247 |
| 6,681,099 B1 * | 1/2004 | Keranen et al. | 455/67.16 |
| 6,847,822 B1 * | 1/2005 | Dennison et al. | 455/456.1 |
| 6,944,141 B1 * | 9/2005 | Yen | 370/330 |
| 7,027,839 B2 * | 4/2006 | Umesh et al. | 455/562.1 |
| 7,043,225 B1 * | 5/2006 | Patel et al. | 455/405 |
| 2003/0146871 A1 * | 8/2003 | Karr et al. | 342/457 |
| 2004/0092275 A1 * | 5/2004 | Krasner et al. | 455/502 |

FOREIGN PATENT DOCUMENTS

| | | |
|---|---|---|
| JP | 2000-50348 A | 2/2000 |
| JP | 2000-075012 | 3/2000 |
| JP | 2000-78667 A | 3/2000 |

* cited by examiner

TO EACH BASE STATION

TO EACH BASE STATION

METHOD OF PROVIDING LOCATION SERVICE USING CDMA-BASED CELLULAR PHONE SYSTEM, A METHOD OF MEASURING LOCATION AND LOCATION SYSTEM

BACKGROUND OF THE INVENTION

1. Field of the Invention

The present invention relates to a method of providing a location service using a mobile communication system.

2. Description of Related Art

A location system using a CDMA-based cellular phone system has been disclosed in a prior art reference, Japanese Patent Laid-Open Publication No. Hei 7-181242.

FIG. 25 shows a model of the above location system formed by three base stations located on a plane. An object 91 represents a mobile station and three base stations are labeled 921, 922, and 923, respectively. Coordinates (x, y) represent the position (coordinates) of the mobile station 91 and coordinates (x1, y1), (x2, y2), and (x3, y3) represent the positions (coordinates) of the base stations 921, 922, and 923, respectively. The base stations 921, 922, and 923 operate, based on common reference time T0. At the same time, the base stations 921, 922, and 923 have predetermined time offsets TO1, TO2, and TO3, respectively. The base stations 921, 922, and 923 repeats the transmission of same PN (pseudonoise) sequences at a same rate over their pilot channels. When the base stations 921, 922, and 923 transmit the PN sequences, the time at which the first pulse of the PN sequences is sent out (in other words, the time at which the transmission of the PN sequences starts) is delayed, according to the time offsets TO1, TO2, and TO3, respectively. Because the base stations also transmit their time offsets over their sync channels, respectively, the mobile station 91 can obtain the above time offsets TO1, TO2, and TO3. In addition, because the base stations transmit the time offsets of their neighboring base stations over their paging channels, the mobile station 91 can obtain the above time offsets TO1, TO2, and TO3. TP1, TP2, and TP3 respectively represent signal propagation time from the base stations 921, 922, and 923 to the mobile station. T1, T2, and T3 respectively represent the time when the first pulse of the PN sequences sent out from the base stations 921, 922, and 923 has arrived at the mobile station 91, measured at the mobile station 91

The position (coordinates) (x, y) of the mobile station 91 can be obtained by solving the following simultaneous equation where c is the velocity of light (x1, y1), (x2, Y2), and (x3, y3) are assumed to be known, but five values, x, y, TP1, TP2, and TP3 are unknown.

$$(x-x1)^2+(y-y1)^2=(c \times TP1)^2$$

$$(x-x2)^2+(y-y2)^2=(c \times TP2)^2$$

$$(x-x3)^2+(y-y3)^2=(c \times TP3)^2$$

$$T2-T1=(TO2+TP2)-(TO1+TP1)$$

$$T3-T1=(TO3+TP3)-(TO1+TP1) \quad (1)$$

SUMMARY OF THE INVENTION

If equation 1 is used, a mobile station operated by someone who is not a subscriber to a cellular phone system can locate itself.

An object of the present invention is to render only subscribers to a cellular phone system a precise location service.

The present invention offers a location service which is summarized below. At least three base stations transmit a specific signal pattern at given intervals. This allows a mobile station that received this signal pattern to locate itself by using the positional information about the base stations, sending timing (or information on phase shift from the reference time) of each signal pattern from the base stations, and signal pattern receiving time information. At least one of the above base stations changes the sending timing of the signal pattern. On this occasion, the mobile terminal or station is notified of the altered reference time offset (or information on phase shift from the reference time) of the sending timing or updated sending timing of the signal pattern.

If the sending timing of the signal pattern changes by one microsecond, the receiving mobile station location which is calculated, based on this signal pattern without parameter update becomes 300 meters off its true reference location. The administrator of the base station where such sending time change occurred notifies the subscribers of the altered reference time offset or updated sending timing of the signal pattern transmitted from the base station. As a result, only the subscribers can exactly locate their mobile station by the calculation based on the signal pattern with parameter update.

If encrypted data communication between the base station administrator and the subscribers is possible, the base station where such sending time change occurred reports the altered reference time offset or updated sending timing of the signal pattern in encrypted form to the subscribers. Consequently, only the subscribers who have a decrypting key can obtain the updated sending timing information.

If a subscriber reports the timing of receiving of the signal pattern to the base station administrator, the administrator can calculate the location of the subscriber's mobile station and notify the subscriber of it without notifying the subscriber of the altered reference time offset or updated sending timing of the signal pattern.

If a plurality of precision levels of notification of the altered reference time offset and updated sending timing of the signal pattern are prepared, a subscriber can be furnished with the positional information about the subscriber's mobile station on a precision level defined by the agreement that the subscriber concluded with the base station administrator.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Figure 1:
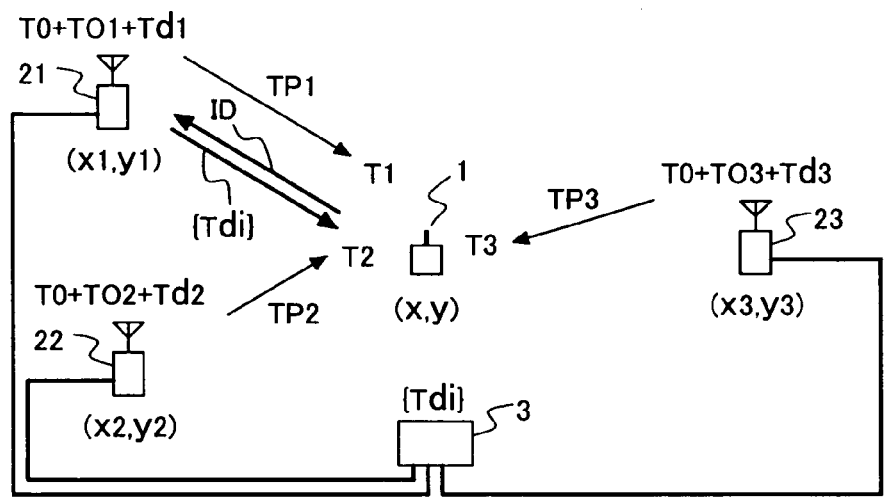
FIG. 1 is a diagram schematizing an example of the location system using a CDMA-based cellular phone system, offered by the present invention.

The outline of a location system using a CDMA-based cellular phone system, offered by the present invention, will now be described with reference to FIG. 1. In FIG. 1, a mobile station is labeled 1, base stations are labeled 21, 22, and 23, and a server is labeled 3.

The base stations 21, 22, and 23 transmits a specific signal pattern at given intervals. This signal pattern, sent at given internals, is, for example, pilot channel PN (pseudonoise) sequences.

The time at which the base stations 21, 22, and 23 send out the above PN sequences is delayed from the reference time T0 which is commonly referenced by the base stations 21, 22, and 23, according to predetermined phase shifts which are different for different base stations. The phase shifts respectively predetermined for the base stations are assumed to be, for example, time offsets TO1, TO2, and TO3, respectively preset for the base stations 21, 22, and 23 plus reference time offsets Td1, Td2, and Td3 which are newly defined for the base stations 21, 22, and 23, respectively. The sending timing of the PN sequences from the base stations 21, 22, and 23 is expressed in (T0+TO1+Td1), (T0+TO2+Td2), and (T0+TO3+Td3).

How to give the reference time offsets Td1, Td2, and Td3 will be described later. The server 3 to which all base stations are connected stores the reference time offset Tdi (where i=1, 2, 3) of each base station.

Figure 2:
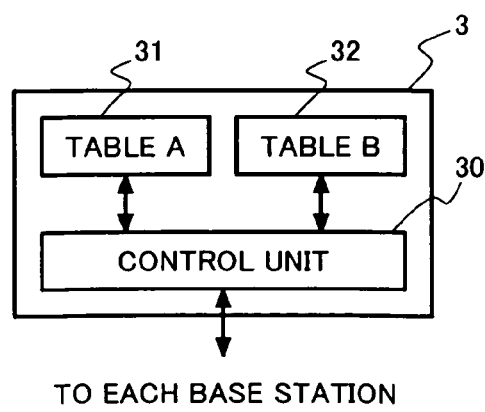
FIG. 2 is a diagram showing an example of the configuration of a server in the location system offered by the present invention.

Then, the configuration of the server 3 will be explained with reference to FIG. 2. Here, a control unit is labeled 30, a table A for storing the reference time offsets Tdi (where i=1, 2, 3) of the base stations is labeled 31, and a table B for storing the IDs of the subscribers under the contract with the location service provider and charging data thereof is labeled 32. The control unit 30 updates the reference time offsets Tdi (where i=1, 2, 3) of the base stations contained in the table A 31 by making periodical connection to the base stations. The control unit 30 also verifies the ID (identification data) of a mobile station that is accessing the server via a base station by referring to the table B 32 and updates the charging data for the mobile station user identified by that ID contained in the table B 32 as required. Furthermore, the control unit 30 reads the reference time offsets Tdi (where i=1, 2, 3) from the table A 31 and notifies the appropriate mobile station of these offsets via a base station.

How to manage the service carried out by the location system using a CDMA-based cellular phone system, which is the core of the present invention, will be explained below with reference to FIGS. 1 and 2. In FIG. 1, the mobile station 1 monitors the pilot channels of the base stations 21, 22, and 23 and measures time T1, T2, and T3 at which it has received the PN sequences transmitted over these channels, respectively. The mobile station 1 obtains the time offsets TO1, TO2, and TO3 of the base stations transmitted over the sync channels and paging channels from the base stations. A possible method in which the mobile station obtains the information on the positions (coordinates) (x1, y1), (x2, y2), and (x3, y3) of the base stations is such that the base stations notify the mobile station of their position by using their paging channel. Another method is such that the positional information about the base stations is stored in advance into the storage provided on the mobile station. For detail on these methods, refer to the prior art reference Japanese Patent Laid-Open Publication No. Hei 7-181242. By applying either method, the mobile station 1 obtains the positions (coordinates) (x1, y1), (x2, y2), and (x3, y3) of the base stations. To obtain the reference time offsets Td1, Td2, and Td3 of signal pattern transmission from the base stations, the mobile station accesses the server 3 via any base station (the base station 21 in the example in FIG. 1). When accessing the server, the mobile station 1 adds its ID (identification data) to the access request so as to be identified by the location system. The server 3 makes periodical connection to the base stations 21, 22, and 23 and overwrites the reference time offsets Td1, Td2, and Td3 of signal pattern transmission from the base stations stored in the table A 31 shown in FIG. 2. When accessed by the mobile station 1, the server 3 searches its internal table B 32 for a match with the key of the received ID, finds whether the ID matches a subscriber under the contract with the location service provider, and updates the charging data for the subscriber as required. Then, the server 3 retrieves the reference time offsets Td1, Td2, and Td3 of signal pattern transmission from the base stations from the table A 31 shown in FIG. 2 and notifies the mobile station 1 of these offsets via the base station (base station 21 in the example in FIG. 1).

The mobile station 1 determines its position (x, y), using the following simultaneous equation (2):

$$(x-x1)^2+(y-y1)^2=(c \times TP1)^2$$

$$(x-x2)^2+(y-y2)^2=(c \times TP2)^2$$

$$(x-x3)^2+(y-y3)^2=(c \times TP3)^2$$

$$T2-T1=(TO2+TP2+Td2)-(TO1+TP1+Td1)$$

$$T3-T1=(TO3+TP3+Td3)-(TO1+TP1+Td1) \quad (2)$$

Unless the mobile station accesses the server 3, however, it cannot know the reference time offsets Td1, Td2, and Td3 of signal pattern transmission from the base stations. If the reference time offsets Td1, Td2, and Td3 of signal pattern transmission from the base stations are appropriate, the location of the mobile station cannot be determined correctly, according to the above simultaneous equation (2). The permissible range within which the reference time offsets Td1, Td2, and Td3 may be varied will be described later. When the user of the mobile station wants to get a location service, it is necessary to access the server 3 from the mobile station and know the reference time offsets Td1, Td2, and Td3 of signal pattern transmission from the base stations. To obtain the reference time offsets Td1, Td2, and Td3 of signal pattern transmission from the base from the server 3, the mobile station must have its ID verified by the server as a prerequisite step. Consequently, the administrator of the location system can fairly charge the mobile station owner for the location service that it rendered the mobile station.

With regard to embodying the invention as described above, when the server may notify the mobile station of the above reference time offsets that have been rounded off to the required level of location precision, according to the agreement of location service. In this case, on the server 3, after retrieving the reference time offsets of signal pattern transmission from the base stations from the table A 31, its control unit 31 rounds off the reference time offsets to the required level of location precision with error inclusion, based on the charging data contained in the table B 32. If, for example, location precision of 60 meters is required, the reference time offsets should be rounded off such that location can be calculated in steps of 0.2 μsec [=60 m÷(3×10$^8$ m/sec)]. In this way, charge setting is possible, according to the location precision level as required by the subscriber who contracted with the service provider for location service.

With regard to embodying the invention as described above, it is possible to charge the subscribers under the contract with the location service provider in several ways. For example, the charging data may be updated each time the mobile station has accessed the server. In this case, the charging data stored in the table B 32 can be used to generate a bill of detailed charging. Alternatively, a fixed amount of charging for the location service on a monthly basis can be specified in the agreement so that the charging data for the subscriber will not be updated per access to the server. Anyhow, the detail on how to charge for the location service does not define the embodiment of the present invention.

With regard to embodying the invention as described above, it is a noticeable feature that a base station included in the location system offered by the present invention makes change (gives a reference time offset) to the sending timing of a specific signal pattern (pilot PN sequences in the above example) that is transmitted at given intervals from it. However, it is not required that all base stations included in the location system offered by the present invention give a particular reference time offset to the PN sequences to be transmitted from them. At least one of the three base stations involved in locating the mobile station must give a particular reference time offset to the PN sequences to be transmitted from it and this can make it difficult to locate the mobile station exactly. Therefore, for at most two of the above three base stations, the means to give a particular reference time offset to the PN sequences to be transmitted may be omitted. Alternatively, one or two base stations of these three base stations alternately give a particular reference time offset to the PN sequences to be transmitted.

With regard to embodying the invention as described above, although the mobile station included in the location system offered by the present invention obtains the reference time offset information from the server via a base station, the intervention of the base station is not always necessary. It is easily conceivable that the mobile station is connected to a personal computer connected to an internet and the reference time offset information is downloaded from the server via the internet. Alternatively, it is easily conceivable that a storage medium into which reference time offsets have been stored is used and installed in the mobile station.

With regard to embodying the invention as described above, the positions (coordinates) of the base stations and the mobile station included in the location system offered by the present invention are represented by two components of coordinates. However, embodying the invention is not limited to the two-component coordinates representation of the above positions (coordinates). It is easily conceivable that four ore more base stations are included in the location system offered by the present invention and expansion to a three-dimensional location system is possible where the coordinate system including the component of height direction in addition to two coordinate axes is used to represent the positions (coordinates) of the base stations and the mobile station.

Figure 3:
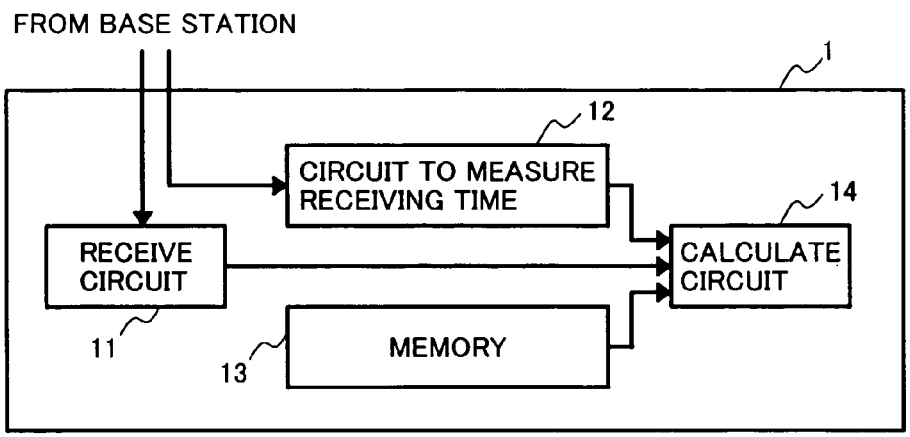
FIG. 3 is a diagram showing an example of the mobile station configured to embody the present invention.

With reference to FIG. 3, an example of the mobile station configured to embody the present invention will now be described. The mobile station 1 comprises: a receive circuit 11 that receives the information (for example, reference time offset, herein) on the sending timing of a specific signal pattern (for example, pilot channel PN sequences, herein) that at least three base stations are transmitting at given intervals from any one of the three base stations; a circuit 12 to measure receiving time that measures the receiving time of each signal pattern transmitted from the above base stations; a memory 13 that retains the positional information (coordinates) about the above base stations; and a calculate circuit 14 that calculates the location of the mobile station by using the above information on the sending timing, the positional information about the above base stations, and the information on the timing of receiving each signal pattern from the above base stations.

Using an example case where the location system offered by the present invention is applied to a cellular phone system compliant with TIA/EIA/IS-95, the permissible range within which the reference time offsets Td1, Td2, and Td3 of signal pattern transmission from the base stations may be varied will be described below. For cellular phone systems compliant with TIA/EOA/IS-95, transmission time delay of pilot channel PN sequences should desirably fall within the range of ±3 µsec of CDMA system time and must fall within the range of ±10 µsec of CDMA system time. Thus, the permissible range within which the reference time offsets Td1, Td2, and Td3 of signal pattern transmission from the base stations may be varied is set at ±10 µsec of CDMA system time. Because a distance estimation error of 300 m takes place per temporal error of 1 µsec, a maximum error of 3000 meters would take place when the mobile station location is calculated. Even if the permissible range within which the reference time offsets Td1, Td2, and Td3 of signal pattern transmission from the base stations may be varied is set at ±3 µsec of CDMA system time, a maximum of error of 900 meters would take place when the mobile station location is calculated. Unless the mobile station is notified of the reference time offsets of signal pattern transmission from the base stations, a reliable location result is difficult to obtain for the observer who expects location precision on the order of 10 meters. Even if the range within which the reference time offsets can be varied is set as described above without having a bad effect on the cellular phone system, the present invention can sufficiently prevent the infrastructure of the location system from being used unfairly.

Then, how to give the reference time offsets Td1, Td2, and Td3 of signal pattern transmission from the base stations will be described below. A first method of giving the reference time offsets is such that a particular reference time offset is given by using the difference in length of the feeder to the antenna of the transmitter on each base station. Because a transmission delay is set, depending on the feeder length, it is advisable to use the transmission delay as a reference time offset. On each base station, a reference time offset set by adjusting the feeder length is measured in advance and recorded in the table A 31 of the server 3. It is also advisable that such reference time offset is maintained per base station and the server 3 records it into the table A 31 or updates the content of the table by making periodical connection to each base station. The permissible range within which the reference time offsets Td1, Td2, and Td3 of signal pattern transmission from the base stations may be varied must be observed as described above.

Figure 4:
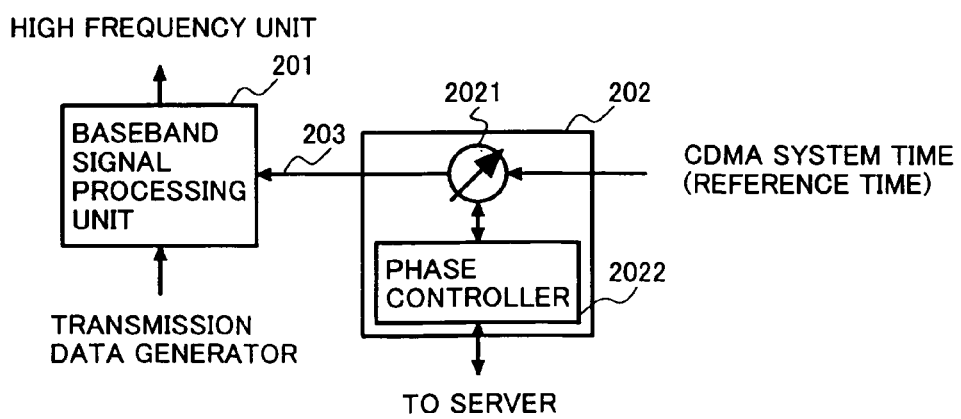
FIG. 4 is a diagram schematizing an example of the means of giving a reference time offset by controlling the clock for transmission from a base station, which may be adopted to embody the location system offered by the present invention.

A second method of giving the reference time offsets is such that a particular reference time offset is given by controlling the clock for transmission from each base station. This second method is explained with reference to FIG. 4 that schematizes a means of giving a particular reference time offset by controlling the clock for transmission from a base station. In FIG. 4, a baseband signal processing unit 201 generates CDMA down channel baseband signals including pilot channel PN sequences by referring to a clock signal 203. A transmission clock controller labeled 202 in FIG. 4 includes a phase shifter 2021 and a phase controller 2022. While referring to the CDMA system clock, the transmission clock controller 202 generates the clock signal 203 whose phase has been shifted as specified by the phase controller 2022. The phase controller 2022 holds this phase shift as a reference time offset. In response to periodical connection to the base station made by the server 3, the base station notifies the server 3 of the reference time offset held by the phase controller 2022. The phase shift specified by the phase controller 2022, that is, reference time offset may be controlled from the server 3. The permissible range within which the reference time offsets of signal pattern transmission from the base stations may be varied must be observed as described above.

Figure 5:
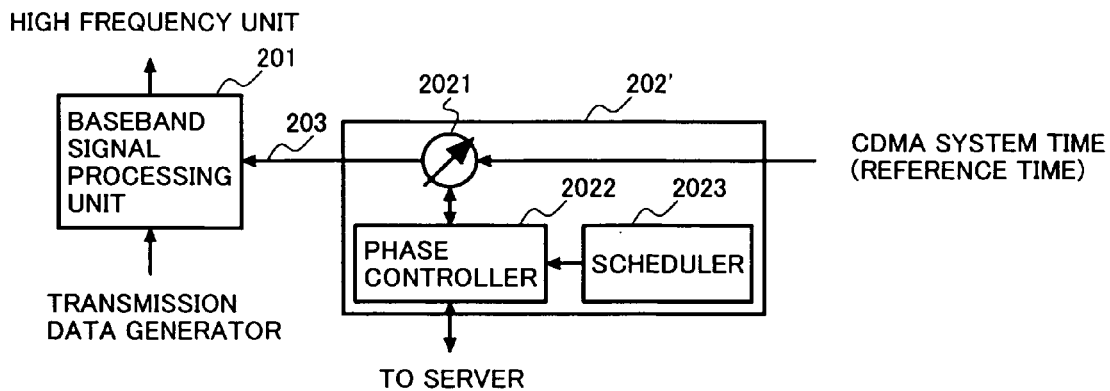
FIG. 5 is a diagram schematizing an example of the means of giving a reference time offset that varies over time by controlling the clock for transmission from a base station, which may be adopted to embody the location system offered by the present invention.

A third method of giving the reference time offsets of signal pattern transmission from the base stations, developed from the second method, is such that a particular reference time offset is given so as to vary over time by controlling the clock for transmission from each base station. This third method is explained with reference to FIG. 5 that schematizes a means of giving a particular reference time offset that varies over time by controlling the clock for transmission from a base station. As compared with FIG. 4 where the means of giving a particular reference time offset by controlling the clock for transmission from a base station is shown, a component of noticeable feature of the third method is a scheduler 2023. The scheduler 2023 maintains a reference time offset control schedule and instructs the phase controller 2022 to set a reference time offset that is to be controlled to alter, depending on time, while referring to the time signal supplied from the external or its internal clock. The phase controller 2022 holds the reference time offset to be set as instructed by the scheduler 2023, and based on this time offset, controls the phase shifter 2021 to generate a clock signal 203 whose phase has been shifted by the reference time offset. In response to periodical connection to the base station made by the server 3, the base station notifies the server 3 of the reference time offset currently held by the phase controller 2022. Alternatively, each time the reference time offset changes that is to be controlled as instructed by the 2023, the base station may notify the server 3 of the altered reference time offset. Alternatively, the scheduler may be removed from the base station and re-installed on the server 3. In this case, the server 3 controls the phase shift, or namely reference time offset to be specified by the phase controller 2022. For the reference time offset control schedule retained in the above scheduler 2023, desirably, it is set to be at random as time passes so that it cannot be presumed easily. The permissible range within which the reference time offsets of signal pattern transmission from the base stations may be varied must be observed as described above.

The permissible range within which the above reference time offset may alter per unit rate (alteration rate) will be mentioned below. If, for example, the location system of the present invention is applied to, for example a cellular phone system compliant with TIA/EIA/IS-95, the above range (alteration rate) is set at 101.725 nsec or less per 200 msec. This is based on that the alteration rate for correcting the timing of signal pattern sending from the base stations in the cellular phone system compliant with TIA/EIA/IS-95 must not exceed 1/8 PN chips (101.725 nsec) per 200 msec. If this limit is exceeded, there is a risk that the signal pattern transmitted from the base stations has a bad effect on the cellular phone system.

Figure 6:
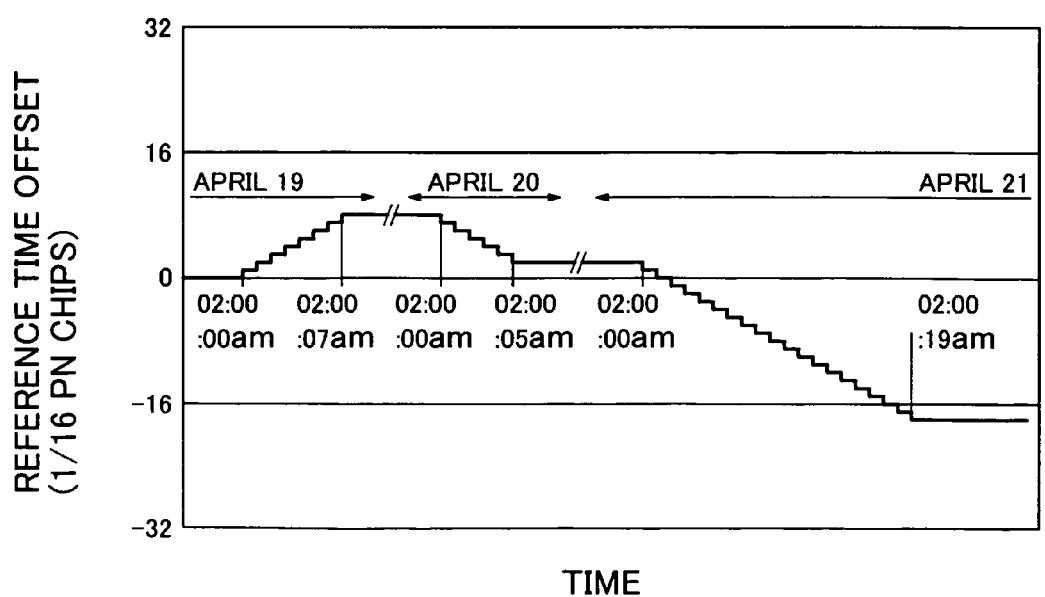
FIG. 6 is a timetable illustrating an example of reference time offset control schedule setting which may be adopted to embody the location system offered by the present invention.

How the above scheduler 2023 can set a reference time offset control schedule will be described below. A first method is such that the reference time offset is altered once a day for a few tens of seconds at midnight. An example of altering the reference time offset according to the first method is shown in FIG. 6. This timetable illustrates how the reference time offset under control is altered for a scheduled time on the assumption that the location system of the invention is applied to the cellular phone system compliant with TIA/EIA/IS-95. Alteration to the reference time offset is executed for a few tens of seconds from 2 a.m. at midnight. For example, on April 19, the reference time offset is set at +8/16 PN chips. On April 20, this reference time offset is altered to +2/16 PN chips which is in turn altered to −18/16 PN chips on April 21. The alteration rate of the reference time offset is assumed to be 1/16 PN chips per second. By thus altering the reference time offset under control once a day, it is more difficult to presume such alteration for a person who does not have the knowledge of reference time offset setting. Therefore, this method is useful for preventing the infrastructure of the location system from being used unfairly. If this first method is applied, the server is required to simply make connection to each base station once a day to update the contents of the table A 31. If the mobile station accesses the server while the reference time offset is being altered on the base station, the server may send the mobile station a reply message such as "Reference time offset alteration is now in process; Access again after a while." The time schedule by which reference time offset alteration will occur may be preset for each base station so that the server can know when the reference time offset is altered on each base station. Alternatively, each base station may notify the server of the start of reference time offset alteration. Alternatively, each base station may notify the server of the end of reference time offset alteration and the altered reference time offset.

Figure 7:
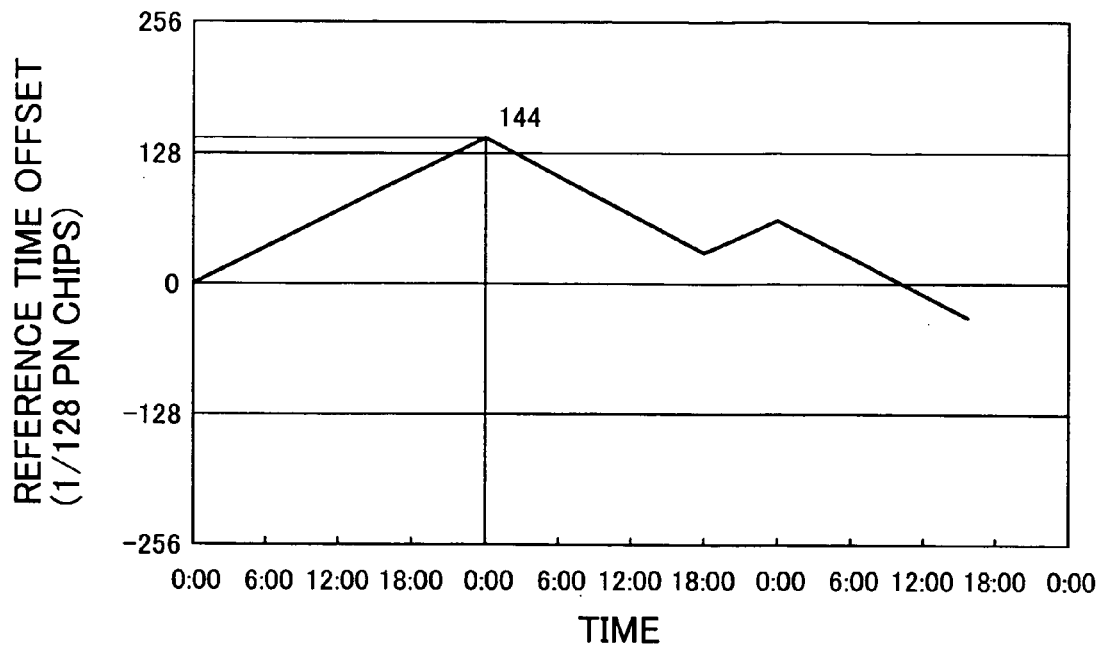
FIG. 7 is a timetable illustrating another example of reference time offset control schedule setting which may be adopted to embody the location system offered by the present invention.

A second method in which the scheduler 2023 sets a reference time offset control schedule is such that the reference time offset is always altered to give a distance error of a few meters for several minutes. An example of altering the reference time offset according to the second method is shown in FIG. 7. This timetable illustrates how the reference time offset under control is altered over time on the assumption that the location system of the invention is applied to the cellular phone system compliant with TIA/EIA/IS-95. In this timetable, for example, the reference time offset alters from ±0 to +144/128 PN chips during 24 hours from 0:00 at the left end on the transverse axis to the first 0:00 toward the right. The alteration rate of the reference time offset is assumed to be 1/128 PN chips for ten minutes (this is converted into a distance error of 1.9 m). By thus altering the reference time offset to give a distance error of a few meters for several minutes, it is more difficult to presume such alteration for a person who does not have the knowledge of reference time offset setting. Therefore, this method is useful for preventing the infrastructure of the location system from being used unfairly. If the second method is applied, the server must make connection to each base station to update the contents of the table A 31 so frequently as every several seconds. As compared with the first method, however, the second method provides more moderate alteration of the reference time offset. Therefore, even if the sever notifies the mobile station of the reference time offset before update as the result of improper access timing of the mobile station, the second method is useful for reducing the error in locating the mobile station to about a few meters, shorter than in the corresponding case with the first method.

Figure 8:
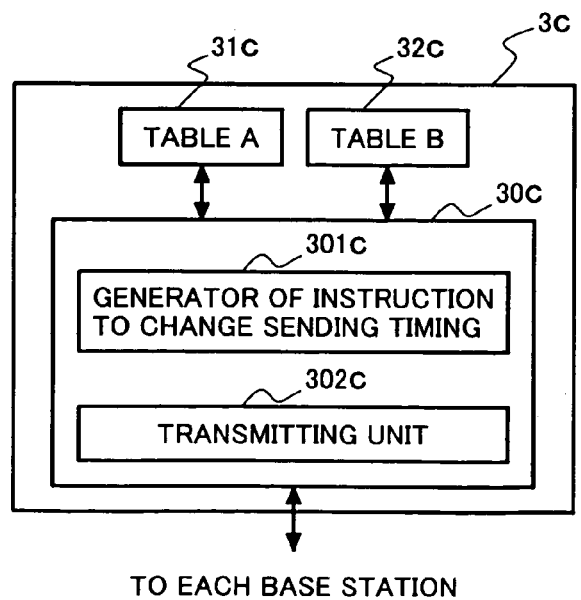
FIG. 8 is a diagram showing an example of the server configuration which may be adopted in the present invention.

With reference to FIG. 8, an example of the server configured to control the reference time offset of signal pattern transmission from each base station, which may be adopted to embody the present invention, will be explained below. The server 3c to which at least three base stations are assumed to connect comprises: a table A 31c for storing the information (for example, reference time offset, herein) on the sending timing of a specific signal pattern (for example, pilot channel PN sequences, herein) that the above base stations are transmitting at given intervals; a table B 32c for storing the IDs of the subscribers under the contract the location service provider and charging data thereof; and a control unit 30c. The control unit 30c includes a generator of instruction to change sending time 301c for controlling the sending timing of each signal pattern from the above base stations (this generator corresponds to the scheduler described hereinbefore) and a transmitting unit 302c that transmits the instruction to change the sending timing to the above base stations.

Figure 9:
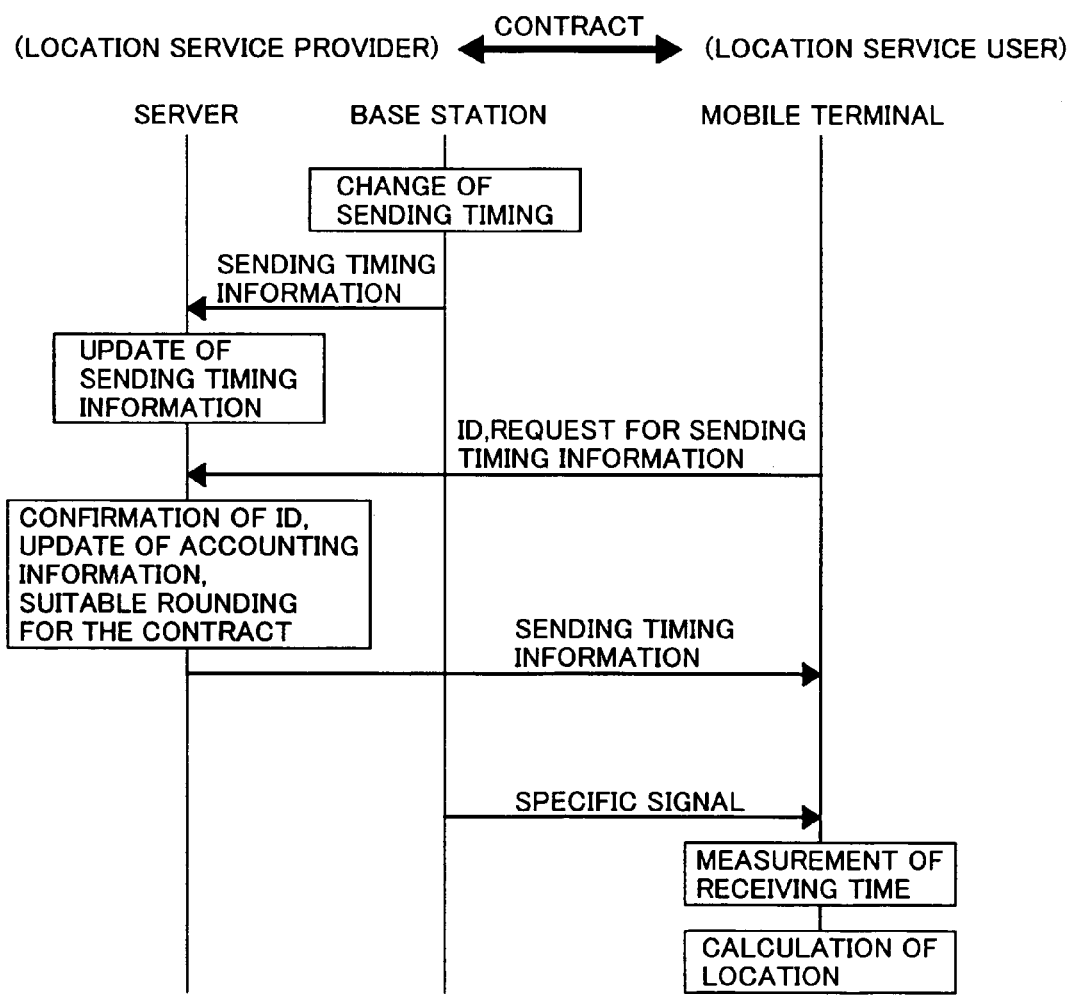
FIG. 9 illustrates an example of the flow of location service that is implemented by the location system offered by the present invention.

FIG. 9 illustrates an example of the flow of location service that is implemented by the location system embodied as described hereinbefore. First, the location service provider contracts the user of a mobile terminal (station) and issues the mobile station ID to the user. The server retains the information on sending timing of a specific signal pattern transmitted at given intervals from the base station. When the sending timing is changed on the base station, the base station notifies the server of the update information on the sending timing. The server updates the sending timing information retained there. When the user wants to know the location of the user's mobile terminal (station), the mobile terminal (station) sends a request for the signal pattern sending timing information with the above ID to the server. After verifying the ID, the server updates the charging data for the user and furnishes the user with the sending timing information on the location precision level predetermined by the agreement of the contract by delivering this information to the user's mobile terminal (station). The user's mobile terminal (station) measures the time at which it receives each signal pattern transmitted from the base stations and calculates its location by using the sending timing information obtained from the server.

Figure 10:
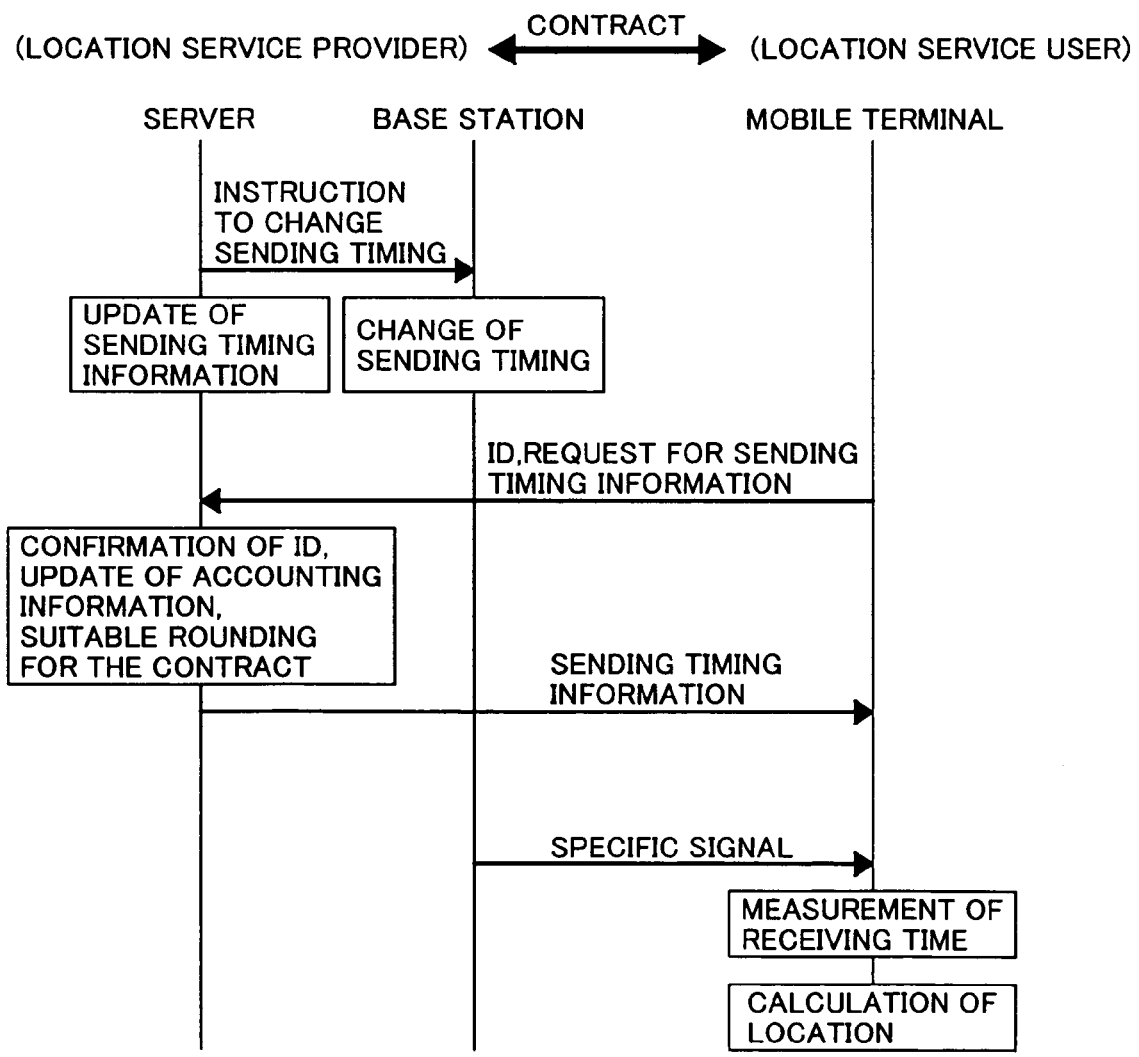
FIG. 10 illustrates another example of the flow of location service that is implemented by the location system offered by the present invention.

FIG. 10 illustrates another example of the flow of location service that is implemented by the location system as described hereinbefore. First, the location service provider contracts the user of a mobile terminal (station) and issues the mobile station ID to the user. The server sends the base station the instruction to change the sending timing of a specific signal pattern transmitted at given intervals from the base station. On receiving this instruction from the server, the base station changes the sending timing of signal pattern as specified in the instruction. The server retains the information on the sending timing of signal pattern and updates this information as it specified in the above instruction. When the user wants to know the location of the user's mobile terminal (station), the mobile terminal (station) sends a request for the signal pattern sending timing information with the above ID to the server. After verifying the ID, the server updates the charging data for the user and furnishes the user with the sending timing information on the location precision level predetermined by the agreement of the contract by delivering this information to the user's mobile terminal (station). The user's mobile terminal (station) measures the time at which it receives each signal pattern transmitted from the base stations and calculates its location by using the sending timing information obtained from the server.

Figure 11:
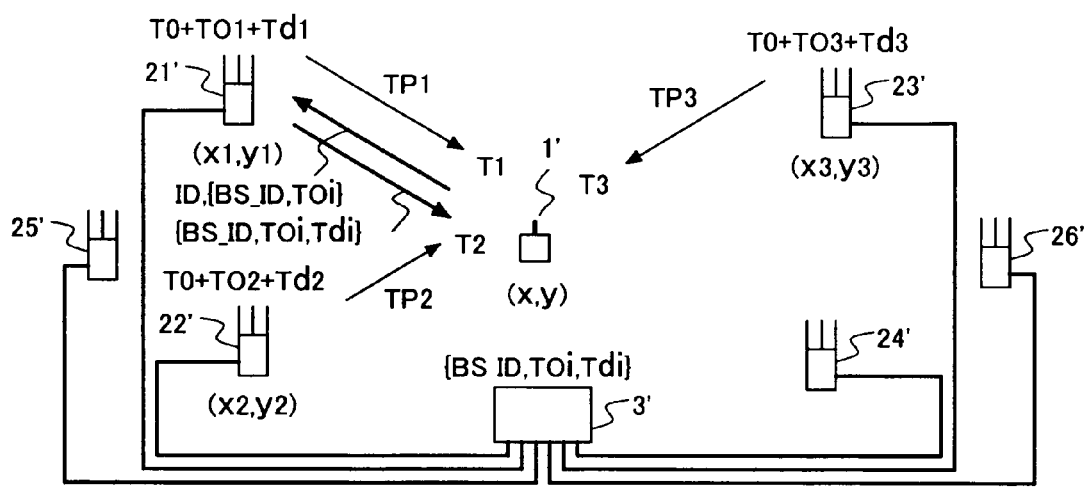
FIG. 11 is a diagram schematizing a second preferred embodiment of the location system using a CDMA-based cellular phone system, offered by the present invention.

A second preferred embodiment of the present invention will be described below. Many base stations usually exist in a location system using a CDMA-based cellular phone system. Furthermore, each base station consists of one or a plurality of sectors, each of which transmits pilot channel PN sequences. Different time offsets are assigned to the pilot channel PN sequences transmitted from the sectors of one base station. When the location of a mobile station is determined, all reference time offsets of PN sequences transmitted from the sectors of the base stations in the system are not necessary. Once the mobile station has succeeded in measuring the time at which it received PN sequences from some sectors respectively, the reference time offsets of the PN sequences transmitted from these sectors are effective for locating the mobile station. In the second embodiment, the mobile terminal identifies the sectors it is receiving PN sequences transmitted from there and sends the server a request to deliver the reference time offsets of the PN sequences as well as the identifiers of these sectors. The server retains the reference time offsets of PN sequences transmitted from the sectors mapped to the IDs pre-assigned to these sectors. The mobile station can easily identify the sector that is transmitting the PN sequences it received and obtain the sector ID. For example, in a cellular phone system compliant with TIA/EOA/IS-95, the time offset (TOi) of PN sequences transmitted from a sector and the ID (BS_ID) of the base station including the sector are transmitted over a paging channel of the base station. Based on these two items of information, the mobile station can identify the sector and obtain its ID. With reference to FIG. 11, this second embodiment of the present invention will be explained below. For convenience of explanation, the ID (BS_ID) of a base station X is assumed to be X. If the time offset of PN sequences transmitted from a sector of the base station X is TOi, the sector will be referred to as "sector TOi of the base station X" for its identification. Each of base stations 21', 22', 23', 24', 25', and 26' is assumed to comprise three sectors. A mobile station 1' is assumed to have received pilot channel PN sequences transmitted from the sector TO1 of the base station 21', sector TO2 of the base station 22', and sector TO3 of the base station 23'. To determine its location, the mobile station 1 sends the server 3 its ID and the IDs for identifying the sectors that are transmitting the pilot channel PN sequences it received, for example, (21', TO1), (22', TO2), and (23', TO3). After verifying the ID of the mobile station 1', the server 3' retrieves the reference time offsets of PN sequences transmitted from the sectors by request and notifies the mobile station 1' of the reference time offsets associated with the sector IDs (21', TO1, Td1), (22', TO2, Td2), and (23', TO3, Td3). The mobile station 1' obtains these reference time offsets and calculates its location from them. In this way, the mobile terminal may identify sectors it is receiving PN sequences transmitted from there and request the server to deliver necessary reference time offsets.

Figure 12:
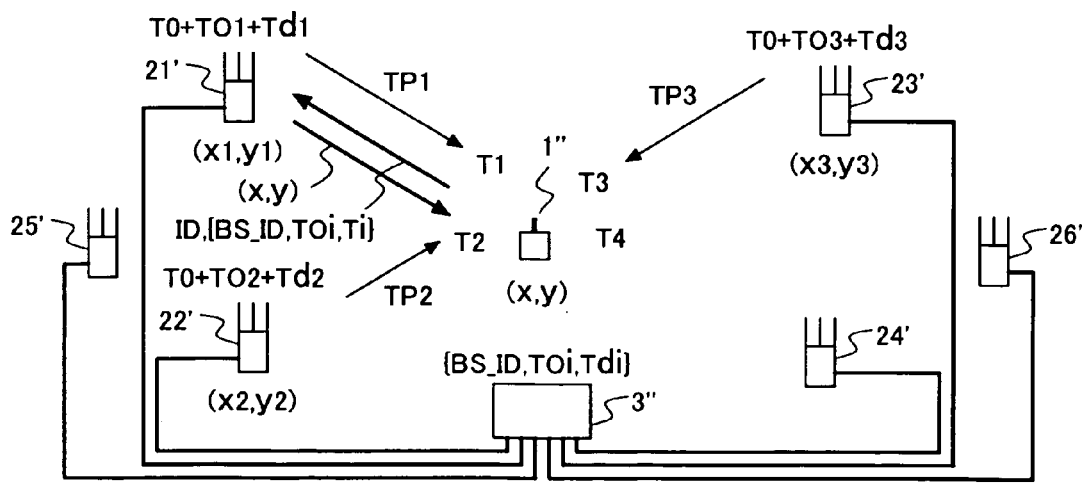
FIG. 12 is a diagram schematizing a third preferred embodiment of the location system using a CDMA-based cellular phone system, offered by the present invention.

With reference to FIG. 12, a third preferred embodiment of the present invention wherein the server calculates the location of a mobile station will be explained below. A mobile station 1" sends the server 3" its ID, the IDs of the sectors that are transmitting the pilot channel PN sequences it received, and information about the time at which it received these pilot channel PN sequences. These sector IDs and information are as many as required. The server 3" retains the reference time offsets of PN sequences transmitted from the sectors mapped to the IDs pre-assigned to these sectors. Furthermore, the server 3" retains the positions (coordinates) (xi, yi) of the base stations. After verifying the ID of the mobile station 1", the server 3" refers to the reference time offsets (Tdi) specific to the sectors, retrieved, based on the supplied sector IDs and the positions (coordinates) (xi, yi) of the base stations including the sectors and calculates the location of the mobile station 1" by solving the above simultaneous equation (2). The server notifies the mobile station 1" of the thus calculated location (x, y) of the mobile station 1" as required. In this way, the sever may calculate the location of the mobile station.

In the following description regarding the third embodiment of the invention, the terms, sectors and base stations will be used without being distinguished for simplification.

Figure 13:
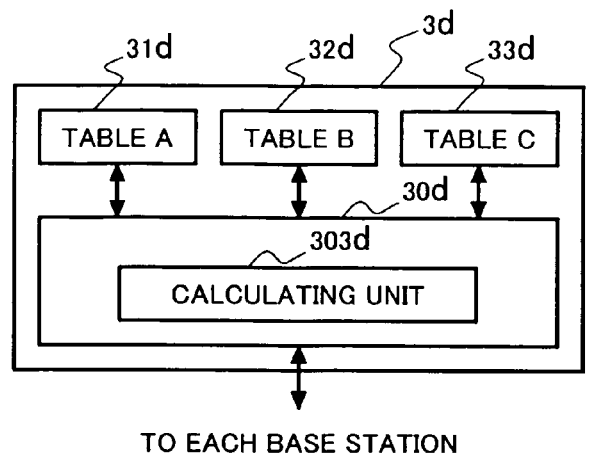
FIG. 13 is a diagram showing an example of the server configured to work in the third embodiment of the invention.

FIG. 13 shows an example of the server configured to calculate the location of a mobile station. As shown, the server 3d to which at least three base stations connect comprises: a table A 31d for storing the information (for example, reference time offset, herein) on the sending timing of a specific signal pattern (for example, pilot channel PN sequences, herein) that the above base stations are transmitting at given intervals; a table B 32d for storing the IDs of the subscribers under the contract with the location service provider and charging data thereof; a table C 33d for storing the positional information (coordinates) about the above base stations; and a control unit 30d. The control unit 30d includes a calculating unit 303d that calculates the location of the mobile station by using the information on signal pattern receiving time measured at the mobile station, which the server received via one of the above base stations, sending timing of each signal pattern from the base stations, and the positional information about the base stations.

Figure 14:
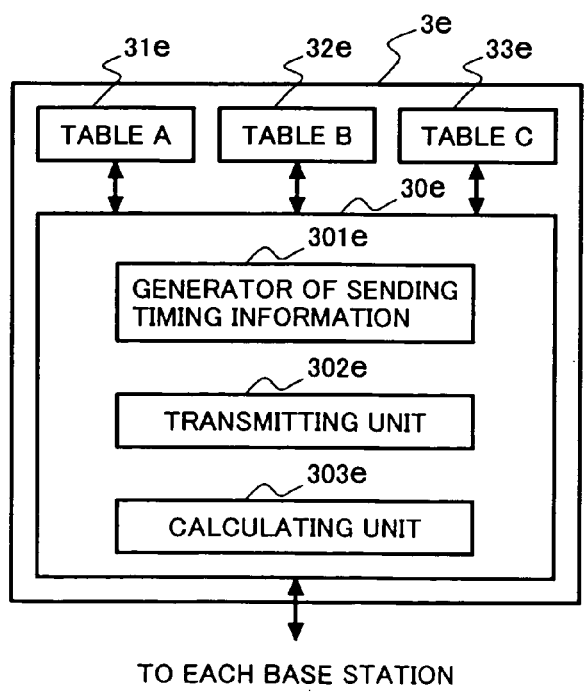
FIG. 14 is a diagram showing another example of the server configured to work in the third embodiment of the invention.

FIG. 14 shows an example of the server configured to instruct each base station to change the signal pattern sending timing and calculate the location of a mobile station. As shown, the server 3e to which at least three base stations connect comprises: a table A 31e for storing the information (for example, reference time offset, herein) on the sending timing of a specific signal pattern (for example, pilot channel PN sequences, herein) that the above base stations are transmitting at given intervals; a table B 32e for storing the IDs of the subscribers under the contract with the location service provider and charging data thereof; a table C 33e for storing the positional information (coordinates) about the above base stations; and a control unit 30e. The control unit 30e includes: a generator of instruction to change sending time 301e for controlling the sending timing of each signal pattern from the above base stations; a transmitting unit 302e that transmits the instruction to change the sending timing to the above base stations; and a calculating unit 303e that calculates the location of the mobile station by using the information on signal pattern receiving time measured at the mobile station, which the server received via one of the above base stations, sending timing of each signal pattern from the base stations, and the positional information about the base stations.

Figure 15:
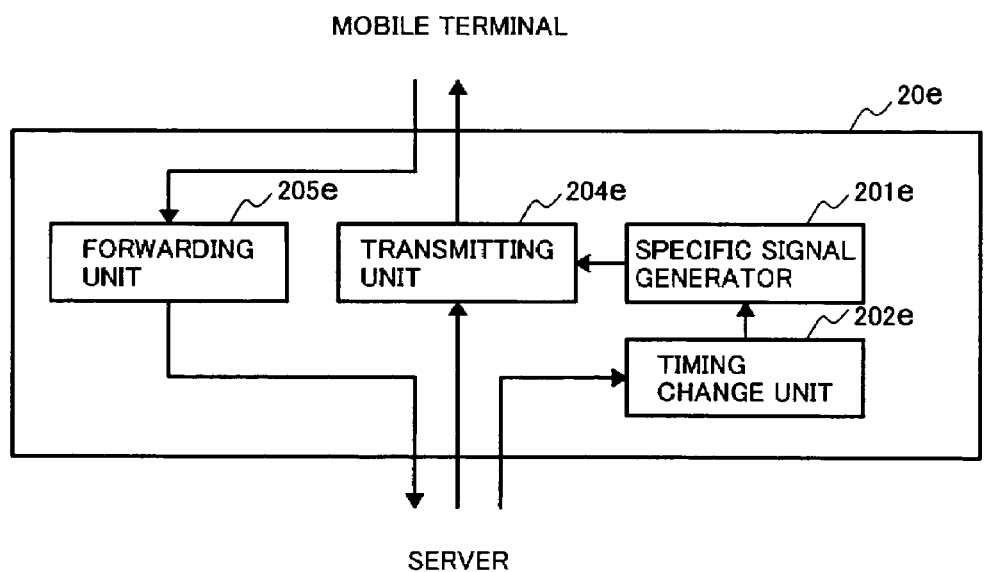
FIG. 15 is a diagram showing an example of the base station configured to work in the third embodiment of the invention.

FIG. 15 shows an example of the base station configured to work in the location system wherein the server instructs each base station to change the signal pattern sending timing and calculates the location of a mobile station and the notification of the result of this calculation is sent to the mobile station via any base station. The base station 20e comprises: a specific signal generator 201e that generates a specific signal pattern (for example, pilot channel PN sequences) which is transmitted at given intervals from the base station; a timing change unit 202e that changes the signal pattern sending timing as instructed by the server; a forwarding unit 205e that forwards the information on a mobile station's receiving timing of each signal pattern transmitted from at least three base stations to the server; and a transmitting unit 204e that transmits the signal pattern and also delivers the result of calculating the location of the mobile station received from the server to the mobile station.

Figure 16:
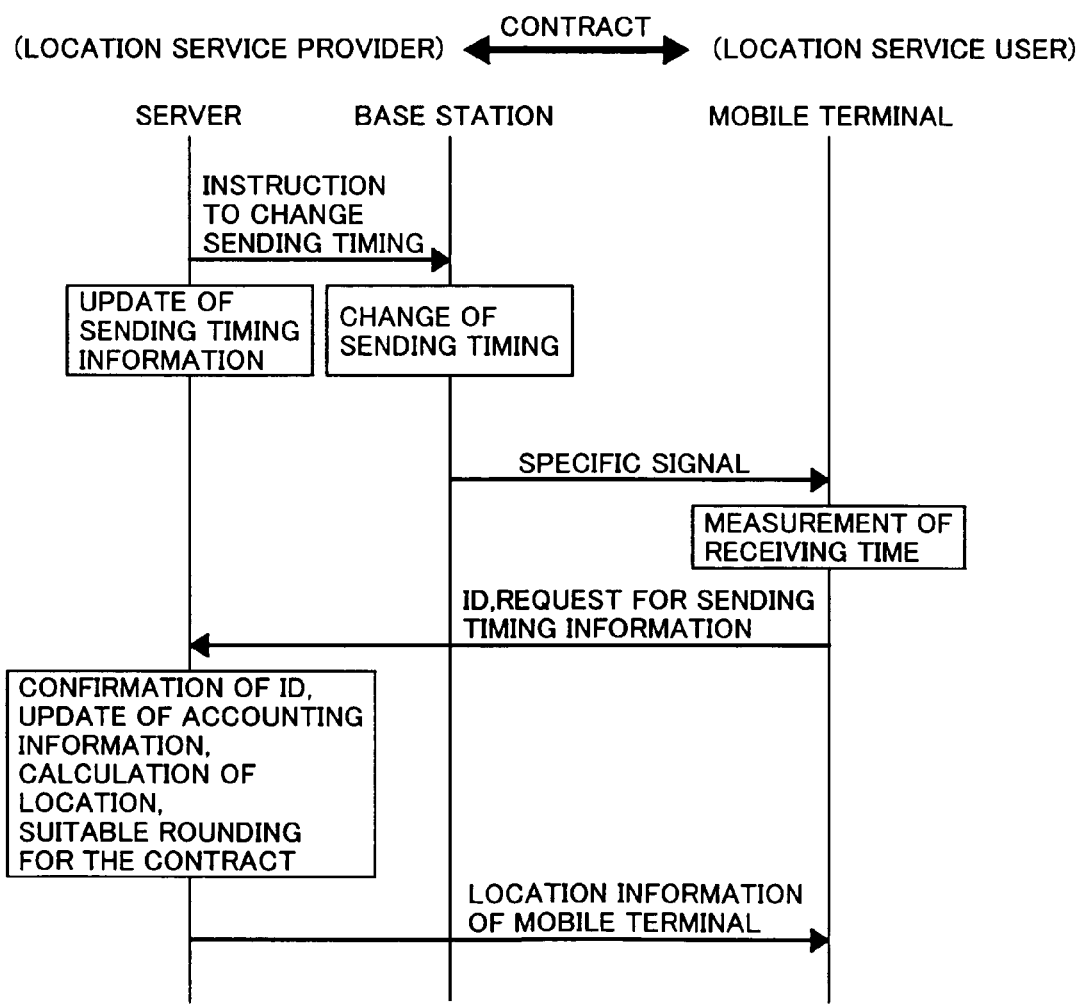
FIG. 16 illustrates an example of the flow of location service that is implemented by the third embodiment of the invention.

FIG. 16 illustrates the flow of location service that is implemented by the location system wherein the server instructs each base station to change the signal pattern sending timing and calculates the location of a mobile station and the notification of the result of this calculation is sent to the mobile station via any base station. First, the location service provider contracts the user of a mobile terminal (station) and issues the mobile station ID to the user. The server sends the base station the instruction to change the sending timing of a specific signal pattern transmitted at given intervals from the base station. On receiving this instruction from the server, the base station changes the sending timing of signal pattern as specified in the instruction. The server retains the positional information (coordinates) about the base stations and the information on the sending timing of signal pattern and updates this timing information as it specified in the above instruction. When the user wants to know the location of the user's mobile terminal (station), the mobile terminal (station)

measures time when it received each signal pattern transmitted from at least three base stations and sends the notification of this receiving timing information with the above ID to the server via one of the above base stations. After verifying the ID, the server updates the charging data for the user as required and calculates the location of the mobile terminal (station) by using the received information on signal pattern receiving time measured at the mobile terminal (station) and the information on sending timing of each signal pattern from the above base stations, and the positional information about the base stations. At this time, the server executes this calculation on the location precision level predetermined by the agreement of the contract. Then, the server notifies the mobile terminal (station) of the location of the mobile terminal (station).

Figure 17:
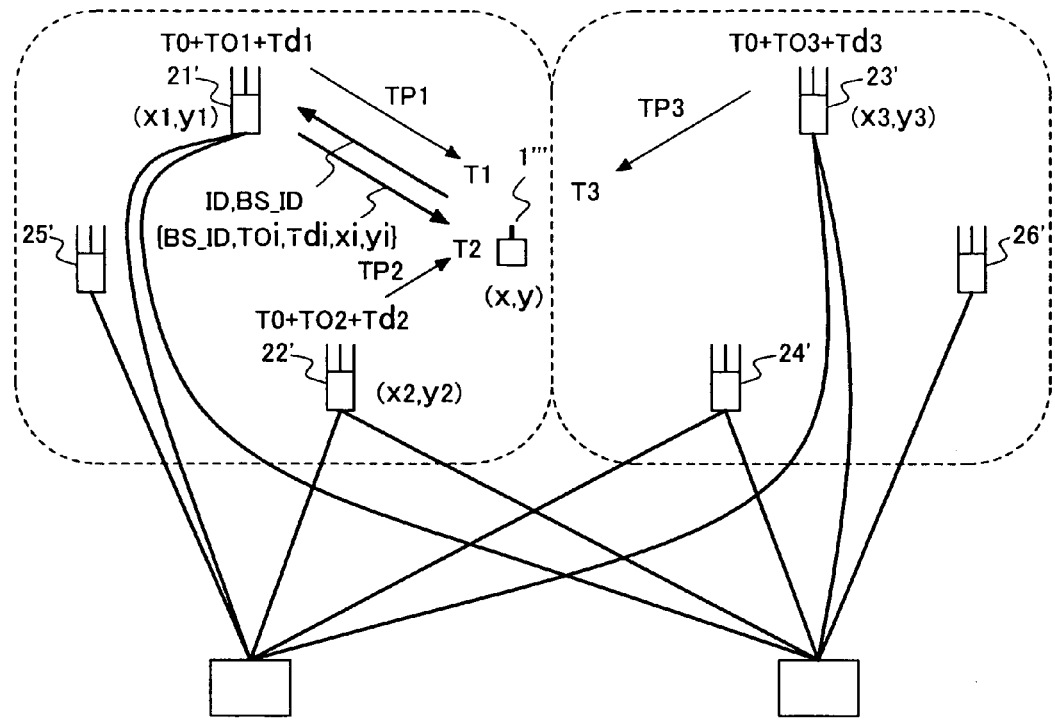
FIG. 17 is a diagram schematizing a fourth preferred embodiment of the location system using a CDMA-based cellular phone system, offered by the present invention.

A fourth preferred embodiment of the present invention will be described below. This embodiment is a development from the foregoing second embodiment. As compared with the second embodiment, the fourth embodiment has two main distinctive features. One feature is that this embodiment system includes a plurality of servers. The other feature lies in information transferred between a mobile station and the servers. These features will be explained below with reference to FIG. 17. Here, the location system is divided into two geographical zones which are labeled system 4A and 4B, respectively. Base stations 21', 22', and 25', each of which consists of three sectors, are placed in the zone 4A. Base stations 23', 24', and 26', each of which consists of three sectors, are placed in the zone 4B. A server 3A retains the reference time offsets and positional information (coordinates) about the sectors of all base stations in the zone 4A mapped to the IDs pre-assigned to these sectors. In addition, the server 3A retains the reference time offsets and positional information (coordinates) about the sectors of base stations that lie in the other zone and are positioned relatively near to the zone 4A, mapped to the IDs pre-assigned to these sectors. In the location system example shown in FIG. 17, the server 3A is assumed to retain the reference time offsets and positional information (coordinates) about the sectors of the base stations 23' and 24' in the zone 4B mapped to the IDs pre-assigned to these sectors. Similarly, a server 3B retains the reference time offsets and positional information (coordinates) about the sectors of all base stations in the zone 4B mapped to the IDs pre-assigned to these sectors. In addition, the server 3B retains the reference time offsets and positional information (coordinates) about the sectors of base stations that lie in the other zone and are positioned relatively near to the zone 4B, mapped to the IDs pre-assigned to these sectors. In the location system example shown in FIG. 17, the server 3B is assumed to retain the reference time offsets and positional information (coordinates) about the sectors of the base stations 21' and 22' in the zone 4A mapped to the IDs pre-assigned to these sectors. Now, a mobile station 1''' is assumed to stay in the zone 4A and have received BS_ID (21') of the near base station 21' to it over the sync channel and paging channel from the base station 21'. The mobile station 1''' sends its ID and the thus obtained BS_ID (21') via the base station 21' to the server 3A. The server 3A verifies the mobile station's ID and sends the mobile station 1''' the time offsets, reference time offsets, and positional information (coordinates) about the sectors of the base station 21' and the time offsets, reference time offsets, and positional information (coordinates) about the sectors of other base stations in the vicinity of the base station 21' (base stations 22', 23', 24', and 25' in FIG. 17), which the server retrieved, based on the BS_ID (21') delivered from the mobile station 1''', via the base station 21'. While referring to the thus received time offsets of signal pattern transmission from the sectors, the mobile station 1''' measures time when it received the pilot PN sequences from the sectors. Then, the mobile station 1''' calculates its location from the thus measured signal pattern receiving time and the above-mentioned reference time offsets and positional information (coordinates) for each sector it received. In the location system example shown in FIG. 17, the mobile station 1''' uses the pilot PN sequences from the sector TO1 of the base station 21' and the sector TO2 of the base station 22' which are included in the zone A and the sector TO3 of the base station 23' included in the zone B to locate itself. In this way, the location system may be divided into zones, in each of which multiple base stations lie with a server provided for each zone. Each server retains the reference time offsets of signal pattern transmission from the sectors of the base stations within its local zone and also retains those from the sectors of the base stations lying outside its local zone, but relatively near to the zone. Thus, the server can supply the information required for location of a mobile station near the boundary between zones. As described above, after the mobile station notifies the server of the BS_ID of the near base station to the mobile station, the server may send the notification of the time offsets, reference time offsets, and positional information (coordinates) about the sectors of the near base station and its neighboring base stations, which it retrieved, based on the above BS_ID, to the mobile station. As an example of modification to this embodiment, only one base station may lie in one zone. In this case, the server for the zone may be integrated into the base station.

Figure 18:
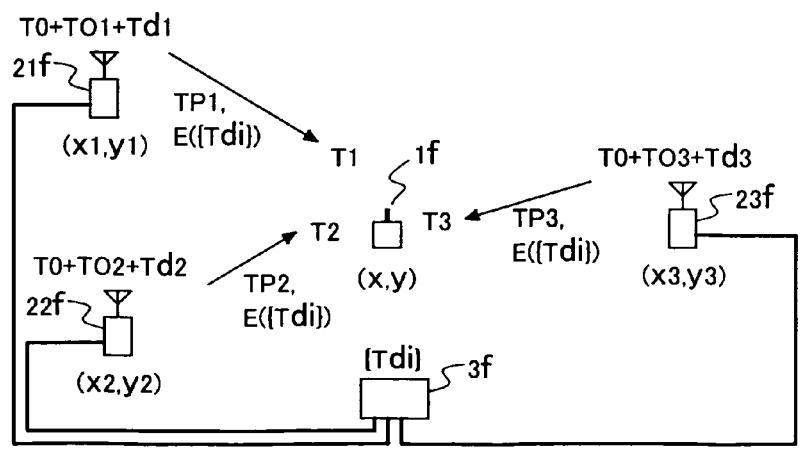
FIG. 18 is a diagram schematizing a fifth preferred embodiment of the location system using a CDMA-based cellular phone system, offered by the present invention.

With reference to FIGS. 18, 19, 20, and 21, a fifth preferred embodiment of the present invention will be explained below. FIG. 18 schematizes the location system configured, according to the fifth embodiment of the invention, which comprises base stations 21f, 22f, and 23f, a mobile station 1f, and a server 3f.

Figure 20:
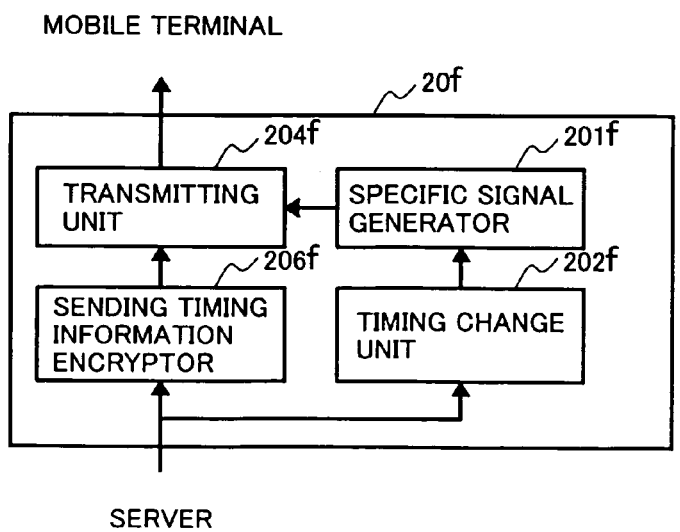
FIG. 20 is a diagram shoring an example of the base station configured to work in the fifth embodiment of the invention.

A base station 20f, which is representative of the base stations 21f, 22f, and 23f, as is shown in FIG. 20, comprises: a specific signal generator 201f that generates a specific signal pattern (for example, pilot channel PN sequences) which is transmitted at given intervals from the base station; a timing change unit 202f that changes the signal pattern sending timing as instructed by the server; a sending timing information encryptor 206f that encrypts the information on sending timing of each signal pattern from the base stations (for example, reference time offsets {Td1, Td2, Td3}) delivered from the server 3f and generates encrypted information E on signal pattern sending timing ({Td1, Td2, Td3}); and a transmitting unit 204f that transmits pilot channel PN sequences, according to the above sending timing, and broadcasts the above encrypted information E on signal pattern sending timing ({Td1, Td2, Td3}).

Figure 21:
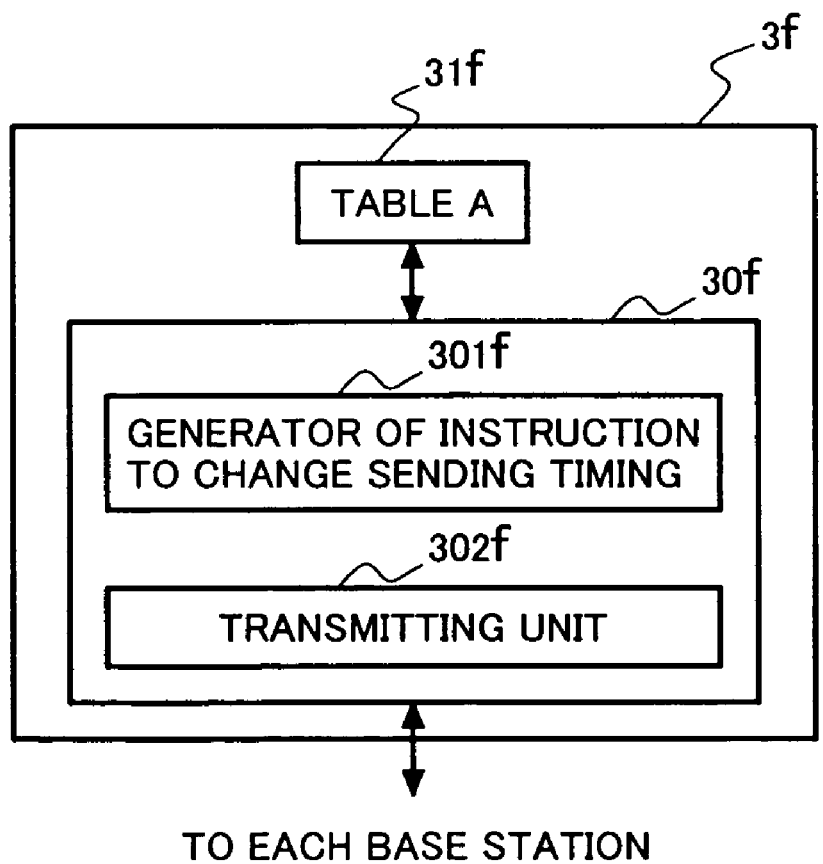
FIG. 21 is a diagram shoring an example of the sever configured to work in the fifth embodiment of the invention.

The server 3f, as is shown in FIG. 21, comprises: a generator 301f of instruction to change sending timing that issues the instruction to alter each of the reference time offsets Td1, Td2, and Td3 of the signal pattern transmitted from each of the base stations 21f, 22f, and 23f; a table A 31f for storing the reference time offsets Td1, Td2, and Td3 which may be altered as described above; and a transmitting unit 302f for delivering the instruction to alter each of the reference time offsets Td1, Td2, and Td3 to one of the base stations 21f, 22f, and 23f.

Figure 19:
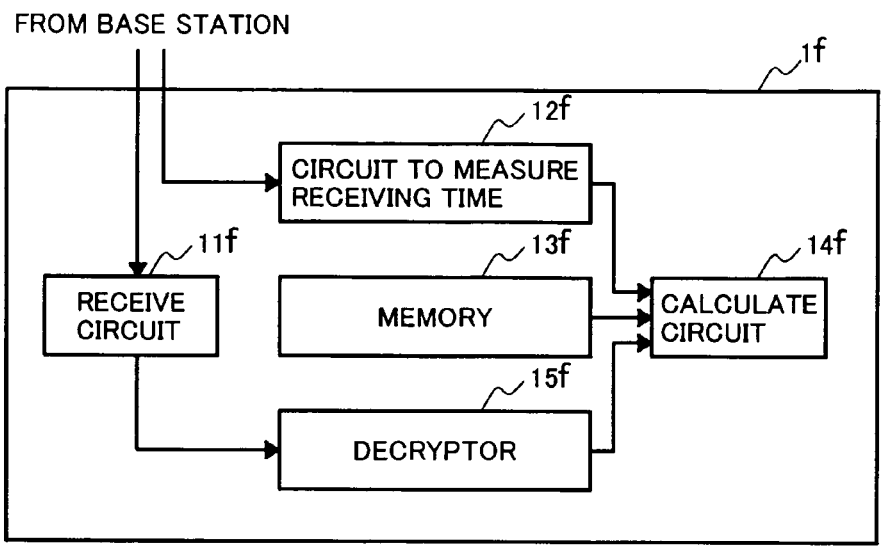
FIG. 19 is a diagram showing an example of the mobile station configured to work in the fifth embodiment of the invention.

The mobile station 1f, as is shown in FIG. 19, comprises: a receive circuit 11f for receiving paging channel signals on which the above encrypted information E on signal pattern sending timing ({Td1, Td2, Td3}) is superimposed; a circuit to measure receiving time 12f for measuring receiving timing T1, T2, and T3 of pilot channel PN sequences from the base stations; a memory 13*f* in which the positional information (coordinates) about the base stations {(x1, y1), (x2, Y2), (x3, Y3)} is stored; a decryptor 15*f* that decrypts the encrypted information E on signal pattern sending timing ({Td1, Td2, Td3}) transmitted over the above paging channel to obtain the information on sending timing of each signal pattern from the base stations, for example, reference time offsets (Td1, Td2, Td3); and a calculate circuit 14*f* that calculates the location of the mobile station, based on the measured receiving timing of pilot channel PN sequences from the base stations, the positional information (coordinates) about the base stations, and the reference time offsets of signal pattern transmission from the base stations obtained by the above decryption.

It is required that a decrypting key be installed into the above decryptor 15*f* to decrypt the encrypted information E on signal pattern sending timing ({Td1, Td2, Td3}), thereby obtaining the sending timing information, for example, reference time offsets (Td1, Td2, Td3), when the mobile terminal owner contracts with the location service provider. A plurality of levels of location precision by the above reference time offsets may be provided for encrypting such offset information. In this case, a decrypting key for a location precision level predetermined by the agreement of the contract must be installed into the mobile station.

Figure 22:
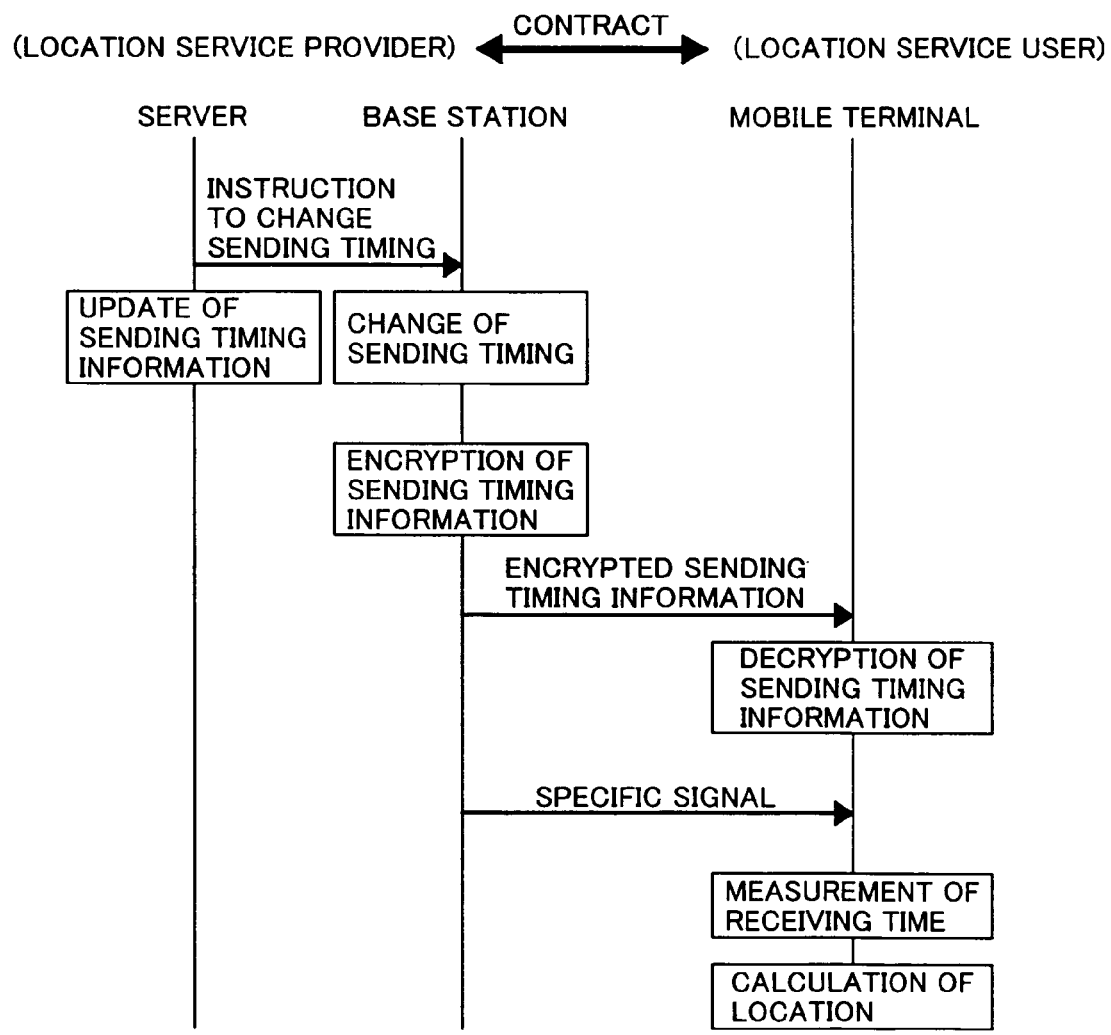
FIG. 22 illustrates an example of the flow of location service that is implemented by the fifth embodiment of the invention.

FIG. 22 illustrates the flow of location service that is implemented by the fifth embodiment of the invention. First, the location service provider contracts the user of a mobile terminal (station) and installs a decrypting key for the location precision level specified by the agreement of the contact into the mobile terminal (station). The server sends the base station the instruction to change the sending timing of a specific signal pattern transmitted at given intervals from the base station. The server retains the information on the sending timing of signal pattern and updates this information as it specified in the above instruction. On receiving this instruction from the server, the base station changes the sending timing of signal pattern as specified in the instruction. Moreover, the base station encrypts the information on the changed sending timing of signal pattern and periodically transmits the thus encrypted information over a broadcast channel. When the user wants to know the location of the user's mobile terminal (station), the mobile station decrypts the above encrypted information on the sending timing of signal pattern transmitted over the broadcast channel with the decrypting key installed in it. The precision of this sending timing information obtained by decryption may vary, according to the agreement of the contract. The user's mobile terminal (station) measures time when it received each signal pattern transmitted from at least three base stations and calculates its location, based on the above sending timing information obtained by decryption.

Figure 23:
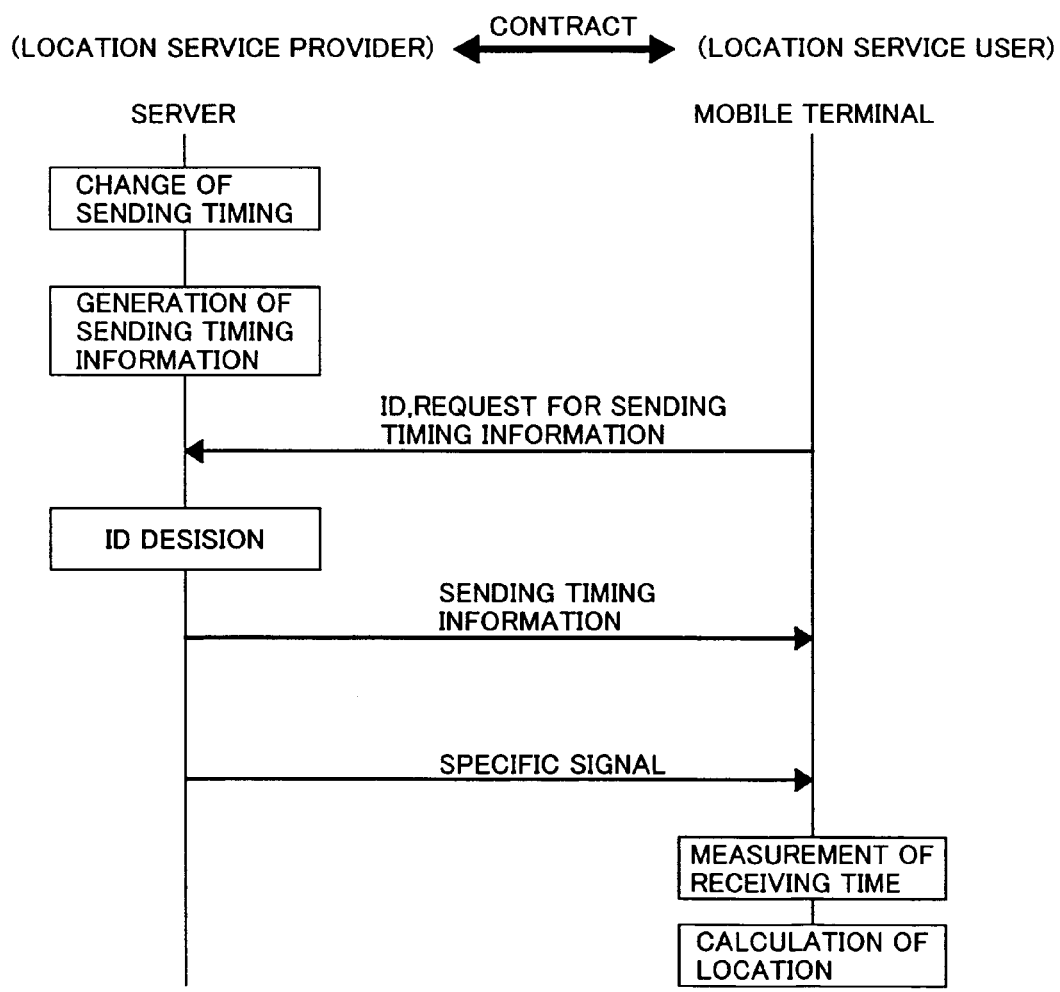
FIG. 23 illustrates an example of the flow of location service that is implemented by a sixth preferred embodiment of the invention.

A sixth preferred embodiment of the present invention will be explained below with reference to FIG. 23 where the flow of location service is illustrated. First, the location service provider contracts the user of a mobile terminal (station) and then issues the mobile station ID to the user and registers this ID with the base stations administrated by the service provider. At least one of at least three base stations administrated by the service provider changes the sending timing of a specific signal pattern transmitted therefrom periodically or at irregular intervals. The base station generates the information on changed sending timing of signal pattern. When the user wants to know the location of the user's mobile terminal (station), the mobile terminal (station) sends a request for the signal pattern sending timing information with the above ID to the base station. On receiving this request, the base station judges whether the ID attached to the request matches the registered one. Once having verified this ID, the base station sends the generated information on sending timing of signal pattern to the mobile terminal (station) The user's mobile terminal (station) measures time when it received each signal pattern transmitted from at least three base stations and calculates its location, base on the above sending timing information it received.

Figure 24:
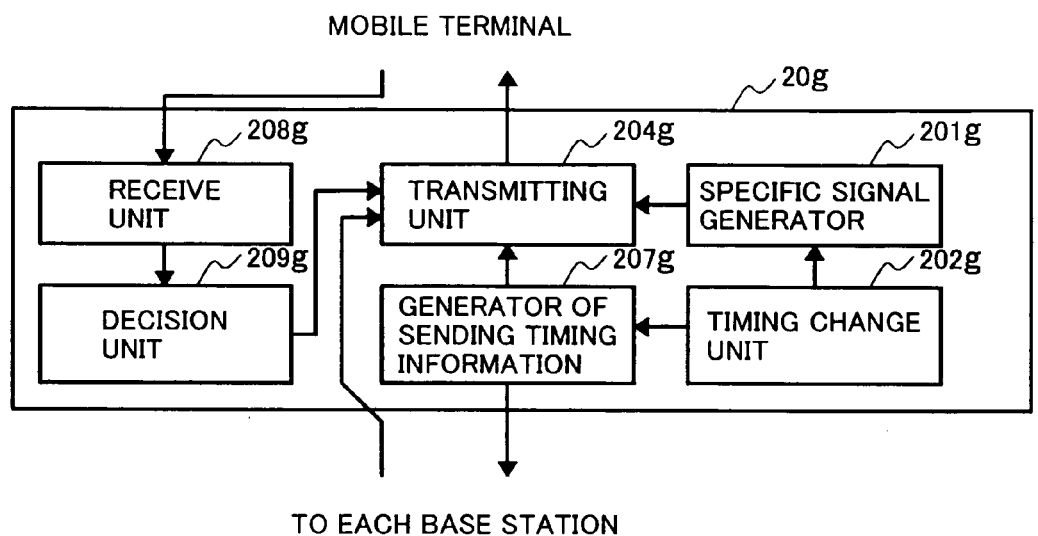
FIG. 24 is a diagram showing an example of the base station configured to work in the sixth embodiment of the invention.
Figure 25:
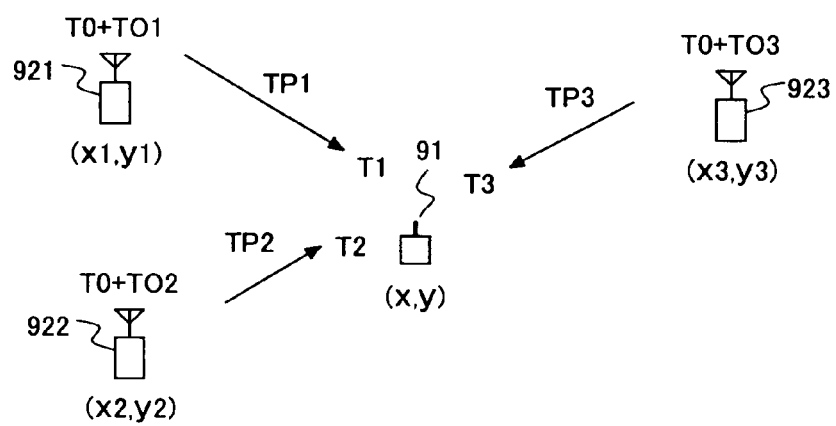
FIG. 25 is a diagram schematizing a conventional location system using a CDMA-based cellular phone system.

FIG. 24 shows an example of the base station configured to work in the sixth embodiment of the invention. As shown, the base station 20*g* comprises: a specific signal generator 201*g* that generates a specific signal pattern which is transmitted at given intervals from the base station; a timing change unit 202*g* that changes the signal pattern sending timing; a generator of sending timing information 207*g* that generates changed sending timing information; a receive unit 208*g* that receives ID from the mobile station; a decision unit 209*g* that judges whether the received ID matches the registered one; and a transmitting unit 204*g* that transmits the above signal pattern and also delivers the above sending timing information to the mobile station, according to the judgment of the decision unit.

Possible methods of presenting the calculated mobile station's location to the mobile station, which are common to all embodiments of the invention, are displaying numerical values of latitude and longitude information and displaying a map near the mobile station and indicating the location of the mobile station with a pointer bullet shown on the background map like the display for an automobile navigation terminal. In the latter case, the error of location precision is also shown with a circle, not the bullet, and the size of the circuit corresponds to the level of location precision. Not only the location service is initiated by the request of the mobile station user, but also the location service may be used to search for a stray old person or child by the request of a person other than the mobile station user. In the latter case, the following method should be used: access the mobile station by making a call or sending an e-mail thereto, then remotely command the mobile station to get the location service and send back the result, namely its location.

In the location system using a CDMA-based cellular phone system according to the present invention, reference time offsets are given to the sending timing of pilot channel PN sequences transmitted from the base stations, an ID is assigned to a mobile station owned by a subscriber who contracted with the service provider for location service using the above location system, and the server to which the base stations connect makes management of the reference time offsets and ID. Even if an observer who does not have the knowledge of the reference time offsets attempts to operate his or her mobile station to measure time when it received the pilot channel PN sequences from the base stations and calculate its location, base on such measurements, the observer will only obtain the result of location including some error. In this way, the location system can prevent the infrastructure for location being used unfairly. The mobile station is notified of the reference time offsets, as a prerequisite for that, the server verifies the ID of the mobile station when accessed from the mobile station. Thus, the mobile station user whom the service provider rendered the location serve is fairly charged.

The reference time offsets may be rounded off to a required level of location precision as specified in the agreement of the location service contract and the notification of these time offsets is sent to the mobile station. Charging can be set, according to the location precision level required by the subscriber who contracted with the service provider for location service.

If charging data is updated each time the mobile station accesses the server, the charging data stored in the table B 32 can be used for detailed charging.

The reference time offset to be given to the sending timing of pilot channel PN sequences transmitted from each base station may be set to alter randomly for a given time in a range that such alteration does not have a bad effect on the cellular phone system. This produces an effect that it is more difficult to presume the reference time offset for an unauthorized observer. In the first method of setting the reference time offset, the reference time offset is altered for a few tens of seconds once a day at midnight on a base station. If this method is applied, it is sufficient to make the connection between the server and the base station once a day which is required to update the reference time offset data for the base station, retained on the server. The second method of setting the reference time offset is that the reference time offset is always altered to give a distance error of a few meters for several minutes. As compared with the first method, the second method provides more moderate alteration of the reference time offset. Therefore, even if the sever apprises the mobile station of the reference time offset before update as the result of improper access timing of the mobile station, the second method is useful for reducing the error in locating the mobile station to about a few meters, shorter than in the corresponding case with the first method.

If the mobile station identifies a certain sector of a base station and requests the server to send only the necessary reference time offset data, this is effective as the traffic from the server to the mobile station can be reduced.

If the server executes the calculation for locating the mobile station, the server can make unified management of all basic data for location such as the positional information (coordinates) about the base stations and the reference time offsets of signal pattern transmission from the base stations.

Under the circumstances where the server processing capacity is not sufficient to cover a wide area, the location system configuration using a plurality of servers is effective.

The location system may be configured such that the mobile station can obtain the time offsets, reference time offsets, and positional information (coordinates) about the near base station to it and other neighboring base stations. This is effective for reducing the processing on the mobile station.

The reference time offset information may be encrypted and broadcasted from each base station so that it can be decrypted with a decrypting key that is open to only the mobile terminal owned by a subscriber who contracted with the service provider for location service. This makes it difficult to execute location using the location system in question for an observer who is not a subscriber under the contract with the service provider. Moreover, this makes the access from the mobile station to the server unnecessary, and therefore communication cost can be reduced.

The present invention is not limited to the above embodiments and various changes and modifications can be made within the spirit and scope of the present invention. Therefore, to appraise the public of the scope of the present invention, the following claims are made.

What is claimed is:

1. A method of furnishing a location service comprising:
    transmitting a specific signal pattern at given intervals from at least three base stations, wherein a location of a mobile terminal or station that receives said signal pattern is located by using positional information about said base stations, sending timing or information on a phase shift from reference time of each said signal pattern from said base stations, and signal pattern receiving time information;
    deliberately making a change to the sending timing of said signal pattern from at least one of said base stations; and
    responsive to the change of the sending timing of the signal pattern, notifying said mobile terminal or station of an altered reference time offset or information on a phase shift from the reference time of said sending timing or updated sending timing of said signal pattern;
    wherein if a request is issued from said mobile terminal or station to at least one of said base stations while the sending timing of said signal pattern is changed, a message representing that a location determination is not possible is sent to said mobile terminal or station.

2. The method of furnishing a location service according to claim 1, wherein in response to a request issued from said mobile terminal or station to at least one of said base stations, said altered reference time offset or updated sending timing of said signal pattern is sent to said mobile terminal or station.

3. The method of furnishing a location service according to claim 2, wherein said altered reference time offset or updated sending timing of said signal pattern is sent to said mobile terminal or station after receiving information identifying said mobile terminal or station together with said request, and verifying the identification of said mobile terminal or station.

4. The method of furnishing a location service according to claim 3, wherein said mobile terminal or station is notified of said altered reference time offset or sending timing of said signal pattern on one of different precision levels, according to an agreement between the owner of the mobile terminal or station and the administrator of said base stations.

5. The method of furnishing a location service according to claim 2, wherein charging data for said mobile terminal or station is updated in response to said request.

6. The method of furnishing a location service according to claim 1, wherein:
    said mobile terminal or station is furnished with a decrypting key; and
    said base stations include at least three base stations, each of the base stations encrypts said altered reference time offset or updated sending timing of each said signal pattern transmitted from the base stations and broadcasts the encrypted information over a broadcast channel or control channel.

7. The method of furnishing a location service according to claim 1, wherein the sending timing of said signal pattern from at least one of said base stations is changed regularly.

8. The method of furnishing a location service according to claim 1, wherein said base stations include at least three base stations, each of the base stations broadcasts positional information about a position of the broadcasting base station and neighboring base stations over a broadcast channel or control channel in response to a request received from the mobile terminal or station.

9. A method of furnishing a location service wherein a location of a mobile terminal or station is determined using sending timing of signal patterns transmitted from a plurality of base stations, and receiving timing of said signal patterns at the mobile terminal or station, the method comprising the steps of:
    deliberately making a change to the sending timing of a specific signal pattern of radio waves transmitted at given intervals from a base station regularly; and
    notifying the mobile terminal or station of an altered reference time offset of said sending timing or updated sending timing of said signal pattern;

wherein if a request is issued from said mobile terminal or station to at least one of said base stations while the sending timing of said signal pattern is changed, a message representing that a location determination is not possible is sent to said mobile terminal or station.

10. The method of furnishing a location service according to claim 9, wherein the identification of said mobile terminal or station is verified and said mobile terminal or station is notified of the altered reference time offset of said sending timing or updated sending timing of said signal pattern.

11. The method of furnishing a location service according to claim 10, wherein said mobile terminal or station is notified of said altered reference time offset or updated sending timing of said signal pattern on one of different precision levels, according to an agreement between the owner of the mobile terminal or station and the administrator of at least three base stations including said base station.

12. The method of furnishing a location service according to claim 10, wherein charging data for said mobile terminal or station is updated when the identification of said mobile terminal or station is verified.

13. The method of furnishing a location service according to claim 9, wherein:
said mobile terminal or station is furnished with a decrypting key; and
said base station encrypts said altered reference time offset or updated sending timing of said signal pattern transmitted from the base station, and broadcasts the encrypted information over a broadcast channel or control channel.

14. A method of furnishing a location service comprising:
deliberately making a change to the sending timing of a specific signal pattern of radio waves transmitted at given intervals from a base station regularly or at irregular intervals;
calculating the location of a mobile terminal or station, based on the receiving timing of said signal pattern received at said mobile terminal or station; and
notifying said mobile terminal or station of a result of the calculating step;
wherein if a request is issued from said mobile terminal or station while the sending timing of said signal pattern is changed, a message representing that a location determination is not possible is sent to said mobile terminal or station.

15. The method of furnishing a location service according to claim 14, wherein the identification of said mobile terminal or station is verified.

16. The method of furnishing a location service according to claim 15, wherein said mobile terminal or station is notified of the result of the calculating step using one of different precision levels, according to an agreement between the owner of the mobile terminal or station and the administrator of said base station.

17. The method of furnishing a location service according to claim 15, wherein charging data for said mobile terminal or station is updated when the identification of said mobile terminal or station is verified.

18. A method for locating a mobile terminal or station comprising the steps of:
sending an ID of the mobile terminal or station, and a request for information on the sending timing of a specific signal pattern transmitted at given intervals from base stations in the vicinity of the mobile terminal or station to a base station in a zone in which the mobile terminal or station locates; and
determining a location of the mobile terminal or station based on an answer from said base station in the zone in which the mobile terminal or station locates, and respective receiving timing of the signal pattern from each of said base stations in the vicinity of the mobile terminal or station;
wherein if a request is issued from said mobile terminal or station to at least one of said base stations while a sending timing of said signal pattern is changed, a message representing that a location determination is not possible is sent to said mobile terminal or station.

19. The method of claim 18, wherein said mobile terminal or station receives information related to positions of the base stations in the vicinity of the mobile terminal or station over a broadcast channel or control channel from the base station in the zone in which the mobile terminal or station locates.

20. A location system comprising at least three base stations and one mobile terminal or station, wherein:
said base stations transmit a specific signal pattern at given intervals;
at least one of said base stations deliberately changes the sending timing of said signal pattern;
said base stations broadcast encrypted information on sending timing of said signal pattern transmitted from the base stations over at least one broadcast channel or control channel; and
said mobile terminal or station decrypts the encrypted information on sending timing of said signal pattern transmitted from base stations located in the vicinity of the mobile terminal or station by using a decrypting key, and determines a location of the mobile terminal or station based on the decrypted information, positional information about said base stations, and information related to receiving timing of each said signal pattern from said base stations;
wherein if a request is issued from said mobile terminal or station to at least one of said base stations while the sending timing of said signal pattern is changed, a message representing that a location determination is not possible is sent to said mobile terminal or station.

21. A location system comprising at least three base stations and one mobile terminal or station, wherein:
said base stations transmit a specific signal pattern at given intervals;
at least one of said base stations deliberately changes the sending timing of said signal pattern; and
said mobile terminal or station determines a location of the mobile terminal or station based on an altered reference time offset associated with the changed sending timing of said signal pattern or updated sending timing of said signal pattern, positional information about said base stations, and information on receiving timing of each said signal pattern from said base stations;
wherein if a request is issued from said mobile terminal or station to at least one of said base stations while the sending timing of said signal pattern is changed, a message representing that a location determination is not possible is sent to said mobile terminal or station.

22. The location system according to claim 21 further comprising a server for storing the information on sending timing of each signal pattern transmitted from said base stations.

23. The location system according to claim 22, wherein said server instructs said base stations to change the sending timing of signal pattern.

* * * * *